(12) United States Patent
Dilling

(10) Patent No.: US 12,228,158 B2
(45) Date of Patent: *Feb. 18, 2025

(54) STICK FIT FASTENER RECESS SYSTEM

(71) Applicant: Phillips Screw Company, Wakefield, MA (US)

(72) Inventor: Gary Dilling, Gardiner, MA (US)

(73) Assignee: PHILLIPS SCREW COMPANY, Amesbury, MA (US)

(*) Notice: Subject to any disclaimer, the term of this patent is extended or adjusted under 35 U.S.C. 154(b) by 769 days.

This patent is subject to a terminal disclaimer.

(21) Appl. No.: 17/302,094

(22) Filed: Apr. 23, 2021

(65) Prior Publication Data
US 2021/0239148 A1    Aug. 5, 2021

Related U.S. Application Data

(63) Continuation of application No. 15/843,789, filed on Dec. 15, 2017, now Pat. No. 10,995,788.

(51) Int. Cl.
| | |
|---|---|
| *F16B 35/06* | (2006.01) |
| *B21K 1/46* | (2006.01) |
| *B25B 15/00* | (2006.01) |
| *B25B 23/04* | (2006.01) |
| *B25B 23/08* | (2006.01) |
| *F16B 23/00* | (2006.01) |
| *B21K 5/20* | (2006.01) |

(52) U.S. Cl.
CPC .......... *F16B 23/0069* (2013.01); *B21K 1/463* (2013.01); *B25B 15/005* (2013.01); *B25B 23/04* (2013.01); *B25B 23/08* (2013.01); *F16B 23/0007* (2013.01); *B21K 5/20* (2013.01)

(58) Field of Classification Search
CPC ... B25B 23/04; B25B 15/005; F16B 23/0007; F16B 23/0069
See application file for complete search history.

(56) References Cited

U.S. PATENT DOCUMENTS

| | | | |
|---|---|---|---|
| 2,140,449 | A | 12/1938 | Brown |
| 2,173,707 | A | 9/1939 | Brown |
| 2,248,695 | A | 7/1941 | Bradshaw |
| 2,349,458 | A | 5/1944 | Owen et al. |
| 2,474,994 | A | 7/1949 | Tomalis |

(Continued)

FOREIGN PATENT DOCUMENTS

| | | |
|---|---|---|
| CA | 329291 A | 1/1933 |
| CA | 2 128 391 A | 1/1996 |

(Continued)

OTHER PUBLICATIONS

Indian Office Action dated Nov. 30, 2018, issued in connection with Indian Application No. 5488/DELNP/2012 with English translation.

(Continued)

*Primary Examiner* — Gary W Estremsky
(74) *Attorney, Agent, or Firm* — Merchant & Gould P.C.

(57) ABSTRACT

Various embodiments described herein provide a fastener system having straight walled driving surfaces that provides a reliable stick fit feature, while also improving stability of engagement between the system components. A feature of the new system is to allow stick fit engagement of existing standard straight walled drivers in the new system.

11 Claims, 8 Drawing Sheets

(56) References Cited

U.S. PATENT DOCUMENTS

| | | |
|---|---|---|
| 2,800,829 A | 7/1957 | West |
| RE24,878 E | 9/1960 | Smith et al. |
| 3,028,781 A | 4/1962 | Muenchinger |
| 3,108,623 A | 10/1963 | Muenchinger |
| 3,120,012 A | 2/1964 | Muenchinger |
| 3,209,383 A | 10/1965 | Carlson |
| 3,237,506 A | 3/1966 | Muenchinger |
| 3,238,540 A | 3/1966 | Muenchinger |
| 3,238,541 A | 3/1966 | Muenchinger |
| 3,246,556 A | 4/1966 | Phipard, Jr. |
| 3,357,295 A | 12/1967 | Smith |
| 3,439,413 A | 4/1969 | Stillwagon, Jr. |
| 3,584,667 A | 6/1971 | Reiland |
| 3,763,725 A | 10/1973 | Reiland |
| 4,084,478 A | 4/1978 | Simmons |
| 4,089,357 A | 5/1978 | Gill |
| 4,126,908 A | 11/1978 | Gill |
| 4,187,892 A | 2/1980 | Simmons |
| 4,202,244 A | 5/1980 | Gutshall |
| D256,553 S | 8/1980 | Fayle |
| 4,228,723 A | 10/1980 | Cunningham |
| 4,269,246 A | 5/1981 | Larson et al. |
| 4,355,552 A | 10/1982 | Gutshall |
| 4,457,654 A | 7/1984 | Sygnator |
| 4,464,957 A | 8/1984 | Gill |
| 4,527,932 A | 7/1985 | Onasch et al. |
| 4,572,720 A | 2/1986 | Rockenfeller et al. |
| 4,653,244 A | 3/1987 | Farrell |
| 5,019,080 A | 5/1991 | Hemer |
| 5,120,173 A | 6/1992 | Grady |
| 5,203,742 A | 4/1993 | Grady |
| 5,219,253 A | 6/1993 | Shinjo |
| 5,239,253 A * | 8/1993 | Shimizu .................. H02H 3/093 322/90 |
| 5,279,190 A | 1/1994 | Goss et al. |
| 5,364,212 A | 11/1994 | Gill |
| 5,435,680 A | 7/1995 | Schuster |
| 5,461,952 A | 10/1995 | Goss |
| 5,509,334 A * | 4/1996 | Shinjo .................. F16B 23/00 81/436 |
| 5,536,127 A | 7/1996 | Pennig |
| 5,540,531 A | 7/1996 | Choiniere |
| 5,544,993 A | 8/1996 | Härle |
| 5,553,983 A | 9/1996 | Shinjo |
| 5,554,983 A | 9/1996 | Kitamura et al. |
| 5,957,645 A | 9/1999 | Dodd |
| 6,074,149 A | 6/2000 | Habermehl et al. |
| 6,086,303 A | 7/2000 | Flückiger |
| 6,158,310 A | 12/2000 | Goss et al. |
| 6,199,455 B1 | 3/2001 | Wagner |
| 6,223,634 B1 | 5/2001 | Hughes et al. |
| 6,234,914 B1 | 5/2001 | Stacy |
| 6,367,358 B1 | 4/2002 | Stacy |
| 6,575,062 B2 | 6/2003 | Hahn |
| 6,601,482 B2 | 8/2003 | Hughes et al. |
| 6,626,067 B1 | 9/2003 | Iwinski et al. |
| 6,666,638 B2 | 12/2003 | Craven |
| D493,097 S | 7/2004 | Shinjo |
| 6,786,827 B2 | 9/2004 | Hughes et al. |
| 6,843,729 B2 | 1/2005 | Hughes |
| 6,852,037 B2 | 2/2005 | Hughes |
| 6,886,433 B2 | 5/2005 | Totsu |
| 6,890,139 B2 | 5/2005 | Hughes |
| 6,941,635 B2 | 9/2005 | Craven |
| 6,997,085 B2 | 2/2006 | Yamamoto |
| 7,037,059 B2 | 5/2006 | Dicke |
| 7,077,038 B2 | 7/2006 | Toyooka et al. |
| D531,491 S | 11/2006 | Liu |
| 7,225,710 B2 | 6/2007 | Pacheco, Jr. |
| 7,293,949 B2 * | 11/2007 | Dilling .................. B21K 5/20 411/407 |
| D557,131 S | 12/2007 | Liu |
| D567,644 S | 4/2008 | Liu |
| 7,402,016 B2 | 7/2008 | Mn-Feng |
| D581,776 S | 12/2008 | Liu |
| 7,618,327 B2 | 11/2009 | Dilling |
| 7,682,119 B2 | 3/2010 | Chen |
| 7,695,228 B2 | 4/2010 | Craven |
| 7,891,274 B2 | 2/2011 | Dilling |
| D640,918 S | 7/2011 | Totsu |
| 7,988,396 B2 | 8/2011 | Weiss et al. |
| D649,446 S | 11/2011 | Totsu |
| 8,171,826 B2 | 5/2012 | Dilling |
| 8,182,187 B2 | 5/2012 | Siong |
| D662,808 S | 7/2012 | Vandenberg |
| 8,291,795 B2 | 10/2012 | Hughes et al. |
| 8,382,414 B2 | 2/2013 | Vandenberg |
| D678,756 S | 3/2013 | Tsai |
| 8,387,491 B2 | 3/2013 | Dilling |
| 8,480,343 B2 | 7/2013 | Vandenberg |
| D693,210 S | 11/2013 | Vandenberg |
| 8,616,097 B2 | 12/2013 | Hughes et al. |
| 8,904,622 B2 | 12/2014 | Kochheiser |
| 8,926,249 B2 | 1/2015 | Lin |
| 8,931,163 B2 | 1/2015 | Kochheiser et al. |
| 8,955,417 B2 | 2/2015 | Stiebitz et al. |
| D723,910 S | 3/2015 | Totsu |
| 9,103,364 B2 | 8/2015 | Lin |
| 9,163,654 B2 | 10/2015 | Barenski, Jr. et al. |
| 9,234,539 B2 | 1/2016 | Gonciarz et al. |
| 9,261,127 B2 | 2/2016 | Buhl |
| 9,297,402 B2 | 3/2016 | Hughes |
| 9,322,422 B2 | 4/2016 | Park |
| 9,482,258 B2 | 11/2016 | Park |
| 9,562,557 B2 | 2/2017 | Ross |
| 9,624,961 B2 | 4/2017 | Lin |
| 9,903,406 B2 | 2/2018 | Hughes |
| 9,970,470 B2 | 5/2018 | Shih |
| 10,065,293 B2 | 9/2018 | Hettich |
| D842,086 S | 3/2019 | Vandenberg |
| 10,371,193 B2 | 8/2019 | Hughes |
| 10,385,902 B2 * | 8/2019 | Wunderlich ............ B25B 21/00 |
| 10,436,238 B2 | 10/2019 | Falkenstein et al. |
| 10,480,562 B2 | 11/2019 | Shih |
| 10,697,499 B2 | 6/2020 | Goss |
| 10,767,680 B2 | 9/2020 | Lin |
| 10,767,681 B2 | 9/2020 | Hargis |
| 10,865,824 B1 | 12/2020 | Litzinger |
| 10,953,522 B2 * | 3/2021 | Dilling .................. B25B 15/005 |
| 10,954,986 B2 | 3/2021 | Ruhmann et al. |
| 10,954,990 B2 | 3/2021 | Hughes |
| 10,995,788 B2 | 5/2021 | Dilling |
| 11,098,743 B2 | 8/2021 | Perego |
| 11,105,361 B2 | 8/2021 | Lajewardi et al. |
| 11,149,445 B2 | 10/2021 | Vandenberg et al. |
| 11,149,776 B2 | 10/2021 | Hu |
| 11,346,388 B2 | 5/2022 | Dissing |
| 11,359,661 B2 | 6/2022 | Dissing |
| 11,371,547 B2 | 6/2022 | Shih |
| 11,396,898 B2 | 7/2022 | Hsu et al. |
| 11,466,720 B2 | 10/2022 | Dilling |
| 2002/0029665 A1 | 3/2002 | Hughes et al. |
| 2003/0159551 A1 | 8/2003 | Hughes |
| 2004/0033838 A1 | 2/2004 | Hughes et al. |
| 2004/0062623 A1 | 4/2004 | Hughes |
| 2005/0047891 A1 | 3/2005 | Toyooka et al. |
| 2005/0249573 A1 | 11/2005 | Tanner |
| 2005/0265806 A1 | 12/2005 | Craven |
| 2006/0233626 A1 | 10/2006 | Lin |
| 2007/0037121 A1 | 2/2007 | Carter |
| 2007/0059122 A1 | 3/2007 | Lin |
| 2007/0128001 A1 | 6/2007 | Su |
| 2007/0157773 A1 | 7/2007 | Chen |
| 2007/0204552 A1 | 9/2007 | Onofrio |
| 2007/0217887 A1 | 9/2007 | Lin |
| 2007/0237606 A1 | 10/2007 | Takasaki |
| 2008/0038089 A1 | 2/2008 | Lin |
| 2008/0092699 A1 | 4/2008 | Surowiecki |
| 2008/0289455 A1 | 11/2008 | Goss |
| 2009/0162165 A1 | 6/2009 | Chen |
| 2009/0257844 A1 | 10/2009 | Chou et al. |
| 2010/0196122 A1 | 8/2010 | Craven |
| 2010/0269644 A1 | 10/2010 | Edland et al. |
| 2011/0217143 A1 | 9/2011 | Hughes et al. |

(56) References Cited

U.S. PATENT DOCUMENTS

| | | |
|---|---|---|
| 2011/0217145 A1 | 9/2011 | Kochheiser et al. |
| 2012/0155990 A1 | 6/2012 | Chao |
| 2012/0165107 A1 | 6/2012 | Guo et al. |
| 2013/0011216 A1 | 1/2013 | Frank |
| 2013/0068075 A1* | 3/2013 | Stiebitz ............... F16B 23/003 81/460 |
| 2013/0213193 A1 | 8/2013 | Lukes |
| 2014/0060268 A1 | 3/2014 | Goss |
| 2014/0314522 A1 | 10/2014 | Lin |
| 2014/0331826 A1 | 11/2014 | Campbell |
| 2015/0266169 A1 | 9/2015 | Campbell, II |
| 2016/0059391 A1 | 3/2016 | Hettich |
| 2016/0186794 A1 | 6/2016 | Belinda et al. |
| 2016/0230799 A1 | 8/2016 | Pritchard |
| 2016/0305462 A1* | 10/2016 | Wunderlich ............ B25B 21/00 |
| 2017/0016468 A1 | 1/2017 | Lin |
| 2017/0227039 A1 | 8/2017 | Shih |
| 2017/0363130 A1 | 12/2017 | Dilling et al. |
| 2018/0009090 A1 | 1/2018 | Dilling |
| 2019/0186525 A1 | 6/2019 | Dilling |
| 2020/0332822 A1 | 10/2020 | Hsiao |
| 2020/0386256 A1 | 12/2020 | Dissing |
| 2020/0400183 A1 | 12/2020 | Maiwald et al. |
| 2021/0205965 A1 | 7/2021 | Dilling |
| 2021/0222722 A1 | 7/2021 | Hsu et al. |
| 2021/0239148 A1 | 8/2021 | Dilling |
| 2021/0277927 A1 | 9/2021 | Chen |
| 2021/0372457 A1 | 12/2021 | Dissing |
| 2022/0090621 A1 | 3/2022 | Shih |
| 2022/0161398 A1 | 5/2022 | Dilling |
| 2023/0003245 A1 | 1/2023 | Dilling |

FOREIGN PATENT DOCUMENTS

| | | |
|---|---|---|
| CA | 2 183 211 A | 2/1998 |
| CA | 2 466 700 C | 12/2006 |
| CA | 2 708 419 C | 5/2017 |
| CA | 2 897 872 C | 12/2017 |
| CA | 3 040 891 C | 2/2021 |
| CN | 1061839 A | 6/1992 |
| CN | 1234099 A | 11/1999 |
| CN | 1257971 A | 6/2000 |
| CN | 1280653 A | 1/2001 |
| CN | 101310935 A | 11/2008 |
| CN | 102395447 A | 3/2012 |
| CN | 202579561 U | 12/2012 |
| CN | 103185055 A | 7/2013 |
| CN | 105164432 A | 12/2015 |
| DE | 296 01 092 U1 | 3/1996 |
| DE | 296 21 922 U1 | 4/1998 |
| DE | 202 03 279 U1 | 5/2002 |
| DE | 298 24 767 U1 | 8/2002 |
| DE | 10 2004 026 769 A1 | 12/2004 |
| DE | 20 2004 020 104 U1 | 3/2005 |
| DE | 20 2005 014 579 U1 | 11/2005 |
| DE | 10 2005 052 694 A1 | 5/2007 |
| DE | 20 2010 000 168 U1 | 9/2011 |
| DE | 10 2011 008 167 A1 | 7/2012 |
| DE | 20 2012 009 121 U1 | 11/2012 |
| DE | 20 2015 105 276 U1 | 1/2016 |
| DE | 10 2014 219 116 A1 | 3/2016 |
| DE | 20 2016 103 748 U1 | 7/2016 |
| DE | 10 2007 003 518 B4 | 12/2017 |
| DE | 10 2014 003 022 B4 | 1/2018 |
| DE | 10 2017 208 282 A1 | 11/2018 |
| DE | 10 2017 217 740 A1 | 4/2019 |
| DE | 20 2019 105 450 U1 | 1/2020 |
| DE | 10 2018 125 672 A1 | 4/2020 |
| DE | 10 2020 106 413 A1 | 3/2021 |
| DE | 10 2019 219 492 A1 | 6/2021 |
| DE | 10 2020 133 061 A1 | 6/2022 |
| EP | 0488541 A1 | 6/1992 |
| GB | 522331 A | 6/1940 |
| GB | 1360644 A | 7/1974 |
| GB | 1491515 | 11/1977 |
| GB | 2564450 A | 1/2019 |
| JP | 56164212 S | 12/1981 |
| JP | 0737805 H | 4/1995 |
| JP | 2003-13924 A | 1/2003 |
| JP | 2004-197908 A | 7/2004 |
| TW | 200303398 A | 9/2003 |
| TW | M325405 U | 1/2008 |
| TW | 201540968 A | 11/2015 |
| WO | 2004/065067 A1 | 8/2004 |
| WO | 2014121913 A1 | 8/2014 |
| WO | 2016/048822 A1 | 3/2016 |
| WO | 2017/218233 A1 | 12/2017 |
| WO | 2020109760 A1 | 6/2020 |
| WO | 2020160782 A1 | 8/2020 |
| WO | 2022034004 A1 | 2/2022 |

OTHER PUBLICATIONS

International Search Report PCT/US2018/063213 dated Mar. 15, 2019 with Written Opinion.
Office Action, TW Application No. 107106472, dated Aug. 5, 2021, 28 pages.
Supplemental European Search Report, Application No. EP 18 88 7247, dated Aug. 6, 2021, 3 pages.
Written Opinion, Application No. EP 18 88 7247, dated Aug. 6, 2021, 4 pages.
Office Action, CN Application No. 201880080928.1. dated Sep. 18, 2021, 7 pages.
Excerpts from Industrial Fasteners Institute IFI Inch Fastener Standards Book, 9th edition, 4 pages (2014).
International Search Report and Written Opinion for PCT/US2018/017754 mailed May 1, 2018.

* cited by examiner

STICK FIT FASTENER RECESS SYSTEM

This application claims priority as a continuation of U.S. patent application Ser. No. 15/843,789 filed Dec. 15, 2017, the entirety of which is incorporated by reference herein.

BACKGROUND

This application relates in general to drive systems for threaded fasteners, tools for their manufacture, and drivers for applying torque to such fasteners. More specifically this application relates to fasteners that are constructed with straight walled recesses. In particular a fastener system is constructed wherein the driver and fastener engage with improved stability of axial alignment and stick fit.

Threaded fasteners commonly used in industrial applications typically are driven by power tools at high speeds and under high torque loads. Such conditions present difficult design considerations, particularly with respect to the drive systems and, more particularly, with threaded fasteners having a driver engageable recess in the fastener head or a driver engageable exterior contour to the fastener head. Ideally, such a drive system needs to be easily manufactured, both as to recess and head geometry, as well as to associated tooling for forming the fastener head and the drivers for engaging the recess or head geometry. The strength of the head of the fastener should not be adversely affected by the recess. The driver, when mated, should distribute the stress loads uniformly to avoid formation of highly localized regions of stress that might result in deformation of the drive surfaces, or driver, or both, leading to premature failure of the drive system.

The fastener system should resist cam-out of the driver from the recess when the fastener is driven. In many applications, it is very important that the fastener must be capable of withstanding several cycles, as in applications where the fasteners must be removed in order to repair or replace parts or to remove and replace access panels. The fastener drive system ideally should be capable of such repeated cycling, particularly in applications where the recess may be coated and in environments where the recess may become contaminated, painted, corroded or otherwise adversely affected in use. In such applications and environments, it is essential that the drive system maintain driving engagement while applying torque in a removal direction. It may be necessary for the drive system to be capable of applying even higher levels of torque when removing the fastener, as may occur when the fastener is over-tightened during initial assembly, or where corrosion develops at the interface at the engaged threads, or if thermal cycling of the assembled components has placed increased stress on the fastener. These, and other, characteristics often present competing considerations; and compromises of one in favor of another may have to be made.

A variety of recess and driver configurations are in common use, including a number of cross-recesses, such as those described in U.S. Pat. Re. 24,878 (Smith et al.); U.S. Pat. No. 3,237,506 (Muenchinger) and U.S. Pat. No. 2,474,994 (Tomalis). Other fastener geometries include multi-lobe geometries of the type described in U.S. Pat. No. 3,763,725 (Reiland) and ribbed drive systems as described in U.S. Pat. No. 4,187,892 (Simmons). Also among the common recess configurations is the "Allen" system which is essentially a straight walled hexagonally shaped socket receptive to a similarly shaped driver. Fastener systems having multiple lobes with spirally configured drive surfaces are described in U.S. Pat. No. 5,957,645 (Stacy), U.S. Pat. No. 7,293,949 (Dilling), U.S. Pat. No. 8,291,795 (Hughes), each of which are incorporated herein by reference in their entirety and each of which will be referred to herein as example standard spiral drives.

With the exception of the ribbed systems, the walls and faces of the driver and recess typically are designed to fit closely with each other in an effort to achieve face-to-face contact of the driving and driven surfaces. With cross-recess fasteners, such face-to-face engagement can occur only, if at all, when the driver is properly aligned and seated within the recess. As a practical matter, however, in order to enable the driver to be inserted into the recess, there necessarily must be some clearance between the two.

The necessity for such clearance is even more critical with recesses having substantially axially aligned (straight) drive walls, as in the Reiland '725 patent and Allen head systems. In all of these systems, the practical result of the necessity for such clearance is that substantial face-to-face, broad area contact between the driver and recess surfaces is seldom achieved, if at all. With most drive systems for threaded fasteners, the driver mates with the recess in the head in a manner that results in point or line contact rather than face-to-face broad area contact. The actual area of contact typically is substantially less than full face-to-face contact. Consequently, when torque is applied by the driver, the forces applied to the screw head tend to be concentrated in localized areas with resulting high localized stresses and unstable axial alignment. Such localized high stress can plastically deform the recess, forming ramps or other deformations that result in premature, unintended disengagement of the driver from the recess.

A fastener system for maximizing the engageable surface area between the driver and drive surfaces is described in the Stacy '645 patent, which is commonly owned with the subject application. The disclosure of the '645 patent is incorporated in this application by reference. The recess and driver of the '645 patent are constructed with spirally configured engaging surfaces that are substantially aligned parallel with the axis of the fastener and may be classified generically as a straight walled fastener system. A more robust embodiment of the spiral drive fastener system is described in U.S. Pat. No. 7,891,274 (Dilling) and U.S. Pat. No. 8,291,795 (Hughes), commonly owned with the subject application. The disclosures of the Dilling '274 and Hughes '795 patents are also incorporated herein by reference.

The advantages of the invention described in the '645 patent are achieved by configuring the driving and driven surfaces of the driver and fastener, respectively, to conform to a segment of a spiral and, particularly, in a spiral configuration that enables a substantial and generous clearance between the driver and the recess during insertion and removal of the driver, but in which the fully seated driver is permitted to rotate to take up that clearance. The spiral configurations of the drive walls of the driver and the driver-engageable walls of the recess are such that when the spiral walls engage, they do so over a relatively broad area thereby applying and distributing the stress over that broad area. The spirally configured driving and driven walls are oriented to direct a major portion of the applied torque substantially normal to the fastener radius with little, if any, reliance on frictional, near-tangential engagement.

Another example of a straight walled fastener system is the system described in U.S. Pat. No. 3,584,667, issued to Reiland. This reference is incorporated herein by reference. The Reiland '667 patent describes a fastener system in which the driving surface geometries consist of a series of semi-cylindrical surfaces arranged substantially in the shape of a hexagon. The Reiland fastener systems are generically referred to as hex-lobular (or hexalobular) and have driving surfaces that are parallel with the axis of the fastener.

Although straight walled fasteners are in successful general use in many applications, they may experience difficulties resulting from axial misalignment between driver and fastener. In addition it has been difficult to obtain a reliable friction engagement that provides a stick fit feature. A stick fit feature is desired to hold the fastener on the driver in alignment, while the installation of the fastener is initiated. This is especially useful in high volume assembly line operations that use power driven bits to apply torque to the fastener. Axial alignment and stick fit are also important as the fastener length is extended.

In many applications in which a straight walled drive system is used, the driver may be power driven or required to be inserted in locations of limited access or with robotic tools. In such situations, there is a need to releasably engage the fastener on the driver in advance of installation so that the driver can be used as an insertion tool, as well as a driver. In these applications, the driver is inserted into the fastener to establish a "stick fit." For stick fit, the holding force between the driver and the fastener is sufficient to hold the fastener to the driver, and when the driver is moved into position to insert the fastener into the work piece. After insertion of the fastener into the work piece, the force exerted on the fastener by the work piece is sufficient to release the stick fit as the driver is removed. This "stick fit" feature has been attempted in several different types of fasteners, for example, in fastener/driver systems having a cruciform (cross shaped geometry), several are shown in U.S. Pat. No. 4,084,478 (Simmons) and U.S. Pat. No. 4,457,654 (Sygnator). A fastener system having a square drive geometry is illustrated in U.S. Pat. No. 6,199,455 (Wagner). It is observed that the stick fit efforts focus on the drive surfaces.

Six lobed recesses with inclined surfaces and matching driver are shown in US publication 2016/0305462 (Wunderlich) and U.S. Pat. No. 8,955,417 (Stiebitz). In Wunderlich and Stiebitz, the internal radius of the recess lobes are separated by an inclined surface with corresponding inclined surfaces in a special matching driver. It is observed that the configurations do not disclose a stick fit frictional interface.

U.S. Pat. No. 5,509,334 (Shinjo '334) and U.S. Pat. No. 5,435,680 (Schuster), show additional six lobed recesses with an inclined surface and matching driver. In Shinjo '334 and Schuster, the internal radius of the recess lobes are separated by an inclined surface which matches to a corresponding inclined surface in a special matching driver. It is observed that these configurations teach a tight engagement with driver and recess but do not disclose a stick fit as discussed above.

A similar, but eight pointed, recess is shown in U.S. Pat. No. 5,219,253 (Shinjo '253). It too has a configuration that does not disclose a stick fit.

The "stick fit" feature allows the fastener to be releasably engaged on the driver to enable manipulation of the driver and fastener as a unit in hard to reach, automated, and other applications. Once installed, the fastener and driver may be disengaged with minimal effort.

The reference Larson, (U.S. Pat. No. 4,269,246), is of interest in that it employs a partially tapered driver to enhance engagement. In Larson, the internal radius of the driver flutes are disposed parallel to the axis of the driver while the crest of the lobe is tapered inward toward the tip. The expressed purpose of this is to avoid premature interference between bit and recess. It is observed that the configuration results in a line contact between driver and recess both circumferentially and axially and will not enhance stability or frictional engagement.

Also of interest is the reference Goss, U.S. Pat. No. 5,461,952. In Goss a trailing side wall of the driver is tapered to provide a gradually thickening lobe geometry that generates a friction engagement on a drive surface. Since only one side wall is tapered the engagement with the straight sided drive surface becomes a circumferential line contact. Again only the bit is reconfigured. This is because there is a reluctance to alter the recess geometry as it would result in a loss of compatibility with existing drivers. Backward compatibility is a design advantage in any improved fastener system, in particular straight walled systems.

A fastener system configured to provide stick fit in a straight walled fastener is described in the reference Dilling, U.S. Pat. No. 7,293,949, commonly owned with this application. In the Dilling '949 patent interference surfaces are constructed on inner non-driving transition surfaces between the wings of the fastener recess. However, it has been found that even more improvement with added stability is desirable. Added stability is particularly useful when the fastener recess is non-uniform. Non-uniformity may occur due to a number of reasons. Examples include, but are not limited to, machine tolerances during manufacturing, un-even plating, uneven coatings, painting after fastener insertion, or deformation during insertion or previous installation or removal cycles.

It would be desirable to provide improvements in recessed head fasteners and drivers by which the foregoing and other difficulties are reduced or eliminated and stability is increased.

SUMMARY

Various embodiments described herein provide a fastener system having straight walled driving surfaces that provides a reliable stick fit feature, while also improving stability of engagement between the system components. An important feature of the new system is to allow engagement of existing standard straight walled drivers in the new system. In order to accomplish this goal, a new recess, a new recess and driver system, a new punch for forming a recess, and methods of using each are described below.

A stick fit feature is desired to hold the fastener on the driver in alignment, while the installation of the fastener is initiated. This is especially useful in high volume assembly line operations that use power driven bits to apply torque to the fastener. Axial alignment and stick fit are also important as the fastener length is extended.

The straight walled fastener systems of this application are generally constructed with a recess having multiple wings extending radially outward from a central axis and a driver having matching multiple lobes that mate with the wings of the recess. Each of the wings and lobes have driven surfaces consisting of an installation surface and a removal surface depending on the direction of torque applied. These drive surfaces are constructed substantially in a parallel aligned relation to the central axis of the fastener system. Adjacent installation and removal surface of the same wing or lobe are separated at the outer radius by a non-driving wing outer end wall. The diameter formed by the outer radius will be referred to herein as the "A" dimension, as shown in the figures. Adjacent wings are separated at the inner radius by a non-driving transition contour. The diameter formed by the inner radius will be referred to herein as the "B" dimension, as shown in the figures.

To generate an interference fit and provide stick fit, a wedge formed in the transition contour to present a tapered interface surface is formed on the "B" dimension surface of the recess wings. The recess is narrowed in the "B" dimension relative to the standard straight walled recess to provide engagement of a standard straight walled driver. In another aspect, the "A" dimension is also enlarged to provide additional compatibility with other standard straight walled drivers. The artisan will understand that reference herein to a "standard" driver and recess refers to the prevailing industry accepted sizes in the relevant market. Certain specific examples of standard recesses and drivers are referenced below. The described recess provides backwards capability, so as to allow the use of a standard driver in the recess of this application.

To form the mating interface of the driver and fastener, the recess wing transition contours are tapered inward. The interface tapers radially inward from proximate the top of the recess to proximate the bottom of the recess.

The tapered interface surface provides stability to the driver to prevent improper alignment. When the recess and driver are improperly aligned the mating may result in localized areas with high stresses and more severe unstable axial alignment. Such localized high stresses can plastically deform the recess, forming ramps or other deformations that result in premature, unintended disengagement of the driver from the recess and/or damage to the driver.

Localized high stresses may result from a number of factors such as design of the recess, inconsistencies in the manufacture of the fastener or the driver, as well as difficulties encountered in the field. Field-encountered difficulties may include, for example, misalignment of the driver and fastener or inability to fully seat the driver in the recess because of paint or other debris that may have collected in the recess. Even slight misalignment between the driver and the fastener, or a variation of the fastener or driver from design specifications, can result in substantial reduction in the area of contact between the driver and fastener, in many cases resulting in near point-like contact of several portions of the driver and fastener. Application of high torque under such circumstances necessarily results in concentrated stresses in the materials of the driver and the recess that, in turn, can lead to failure of the material, either by plastic deformation or fracture. Even slight plastic deformation of the engagement surfaces of the recess and driver can adversely affect system performance. If the recess deforms to define ramp-like surfaces inclined from the vertical, the driver may "cam-out" of the recess under the influence of the applied load. Such cam-out is undesirable, not only because it results in premature or uncontrollable disengagement of the driver and recess, but also because the suddenly disengaged driver can slip onto and damage the work piece. Additionally, excessive stress in the driver blade while driving the fastener can cause the blade to deform in a manner that reduces the surface area contact with the fastener and effectively shifts the region of contact radially inwardly, thereby reducing the effectiveness of driver-recess engagement and increasing the risk of failure.

The disclosure of this application provides a fastener having a shank having a central longitudinal axis, a head at an end of the shank, the head having a recess centered on the axis, the recess having a plurality of wings radiating outwardly from the axis, the recess having a recess outer radius defined by a radial distance from the axis to the outer-most extent of the wings, each of the wings having an installation driving surface and a removal driving surface, the wing driving surfaces being constructed in substantially parallel alignment with the central longitudinal axis. In one aspect of the disclosure, an installation driving surface and a removal driving surface of adjacent wings are separated by a respective transition contour, the transition contour forming the radially inward-most portions of the wings. In another aspect of the disclosure, a wedge formed in the transition contour to present a tapered interface surface, the interface surface having a top, a bottom and a pair of opposed edges, the width of the interface surface tapering from wider at the top of the interface surface proximate a top of the recess to narrower at the bottom of the interface surface proximate a bottom of the recess. And in yet another aspect of the disclosure an interface surface is positioned a root radial distance from a recess axis at the bottom of the interface surface, the root radial distance defining the recess inner radius, the interface surface positioned a top radial distance from the axis at the top of the interface surface, the top radial distance being larger than the bottom radial distance. And in yet another aspect of the disclosure, a ratio of the recess inner radius to the recess outer radius is from about 0.60 to about 0.65.

In another aspect, an interface surface is a non-driving surface. In another aspect, the interface surface is concave, having a radius of curvature equal to the radial distance from the axis to the interface surface. And in another aspect, the interface surface is concave, having a radius of curvature greater than the radial distance from the axis to the interface surface. In yet another aspect, an interface surface is concave, and each portion of the interface surface is positioned a radial distance greater than or equal to the radial distance from the axis to the transition contour at the interface surface edges. In one particular aspect, the recess is hexalobular. In another aspect, the interface surface is tapered at an angle with respect to the axis in the range of about one half degree (0.5°) to about twelve degrees (12°), and preferably in the range of about four degrees (4°) to about eight degrees (8°), and more preferably about six degrees (6°).

In one aspect of the disclosure, the driving surfaces of the fastener head are constructed to receive the driving surfaces of a driver bit end in a mated engagement. In another aspect, the tapered interface surface is constructed to form a frictional engagement with the driver bit end. And in another aspect, the recess interface surface is concave, having a radius of curvature greater than the radius of curvature of the lobes where the interface frictionally engages the lobes. And in yet another aspect, the tapered interface surface is constructed to form a frictional engagement with the driver bit end at the interface surface edges in the lower part of the recess.

In one aspect of the disclosure, a tapered interface surface is formed between every pair of adjacent wings. In another aspect of the disclosure, a tapered interface surface is formed between a subset of all of the pairs of adjacent wings. And in another aspect of the disclosure, there are a plurality of tapered interface surfaces spaced symmetrically around the recess.

The disclosure further provides a fastener system including a fastener having a shank having a central shank longitudinal axis, a head at an end of the shank, the head having a recess centered on the shank axis, the recess having a plurality of wings radiating outwardly from the shank axis, the recess having a recess outer radius defined by a radial distance from the shank axis to the outer-most extent of the wings, each of the wings having an installation driving surface and a removal driving surface, the wing driving surfaces being constructed in substantially parallel alignment with the shank longitudinal axis, the installation driving surface and removal driving surface of adjacent wings being separated by a respective transition contour, the transition contour forming the radially inward-most portions of the wings. In another aspect of the disclosure a wedge is formed in the transition contour to present a tapered recess interface surface, the interface surface having a top, a bottom and a pair of opposed edges, the width of the interface surface tapering from wider at the top of the interface surface proximate a top of the recess to narrower at the bottom of the interface surface proximate a bottom of the recess, and the interface surface positioned a root radial distance from the shank axis at the bottom of the interface surface, the root radial distance defining the recess inner radius, the interface surface positioned a top radial distance from the shank axis at the top of the interface surface, the top radial distance being larger than the bottom radial distance. In another aspect of the disclosure the system includes a driver having a bit end, the driver having a central driver longitudinal axis, and the bit end is constructed having a central portion and a plurality of lobes radiating outwardly from the central portion, each of the lobes having an installation driving surface and a removal driving surface, installation driving surfaces and a removal driving surfaces of adjacent lobes separated by a transition contour, the transition contour forming the radially inwardly most portions of the lobes and presenting a driver interface surface, and wherein the surfaces of the lobes are constructed in parallel alignment with the driver longitudinal axis. In another aspect of the disclosure the recess is adapted to receive the bit end, and the driving surfaces of the fastener head are constructed to receive the driving surfaces of the driver bit end in a mated engagement, and the recess and driver interface surfaces are constructed to form a frictional engagement when the fastener head and driver bit end are in the mated engagement.

In one particular aspect of the disclosure in the fastener system, the ratio of the recess inner radius to the recess outer radius being from about 0.60 to about 0.65.

The disclosure further provides a punch for forming the head end of a recessed head fastener. In one aspect of the disclosure, the punch includes a body having a face configured to form and define the outer contour of the head, a nib integral with the body and extending from the face, the nib having a central longitudinal axis, wherein the nib is constructed having a central portion and a plurality of wings radiating outwardly from the central portion, the nib having a nib outer radius defined by a radial distance from the axis to the outer-most extent of the wings, each of the wings having a surface configured to form an installation driving surface and a removal driving surface, the installation driving surface and removal driving surface of adjacent wings being separated by a respective transition, the contour forming the radially inner-most portion of the wing, and wherein the driving surfaces are constructed in substantially parallel alignment with the central longitudinal axis, and a wedge formed in the transition contour to present a tapered interface surface, the interface surface having a top, a bottom and a pair of opposed edges, the width of the interface surface tapering from wider at the top of the interface surface proximate a top of the nib to narrower at the bottom of the interface surface proximate a bottom of the nib, the interface surface positioned a root radial distance from the axis at the bottom of the interface surface, the root radial distance defining the recess inner radius, the interface surface positioned a top radial distance from the axis at the top of the interface surface, the top radial distance being larger than the bottom radial distance. In one aspect of the disclosure the ratio of the recess inner radius to the recess outer radius being from about 0.60 to about 0.65.

The disclosure further provides a method of forming a threaded fastener having a driver-engageable recess formed at an end thereof, the method including using a punch to form the recess, the punch including: a body having a face configured to form and define the outer contour of the head, a nib integral with the body and extending from the face, the nib having a central longitudinal axis, wherein the nib is constructed having a central portion and a plurality of wings radiating outwardly from the central portion, the nib having a nib outer radius defined by a radial distance from the axis to the outer-most extent of the wings, each of the wings having a surface configured to form an installation driving surface and a removal driving surface, the installation driving surface and removal driving surface of adjacent wings being separated by a respective transition, the contour forming the radially inner-most portion of the wing, and wherein the driving surfaces are constructed in substantially parallel alignment with the central longitudinal axis, and a wedge formed in the transition contour to present a tapered interface surface, the interface surface having a top, a bottom and a pair of opposed edges, the width of the interface surface tapering from wider at the top of the interface surface proximate a top of the nib to narrower at the bottom of the interface surface proximate a bottom of the nib, the interface surface positioned a root radial distance from the axis at the bottom of the interface surface, the root radial distance defining the recess inner radius, the interface surface positioned a top radial distance from the axis at the top of the interface surface, the top radial distance being larger than the bottom radial distance. In another aspect of the method the ratio of the recess inner radius to the recess outer radius being from about 0.60 to about 0.65.

The disclosure further provides a fastener having a head and a shank having a central longitudinal axis, wherein the head is constructed having a central portion and a plurality of wings radiating outwardly from the central portion, each of the wings having an installation driving surface and a removal driving surface, separated by a non-driving transition contour, the non-driving transition contour forming the radially inward-most portion of the wing, and wherein the driving surfaces are constructed in substantially parallel alignment with the central longitudinal axis of the fastener, and a wedge formed in the non-driving transition contour of the fastener wings to present a tapered interface surface.

These and other features and advantages will be more clearly understood from the following detailed description and drawing of embodiments of the present application.

DETAILED DESCRIPTION OF PREFERRED EMBODIMENTS

Figure 1:
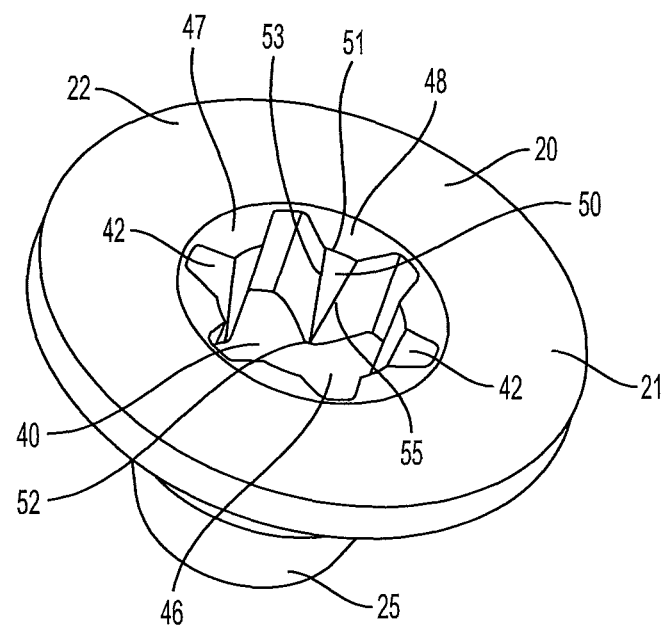
FIG. 1 is a perspective view of an example fastener recess in accordance with disclosed embodiments.

Although the present invention will be described with reference to the embodiments shown in the drawings, it should be understood that the present invention may have alternate forms. In addition, any suitable size, shape or type of elements or materials could be used. Like reference numerals throughout this specification refer to similar features throughout the figures.

Figure 2:
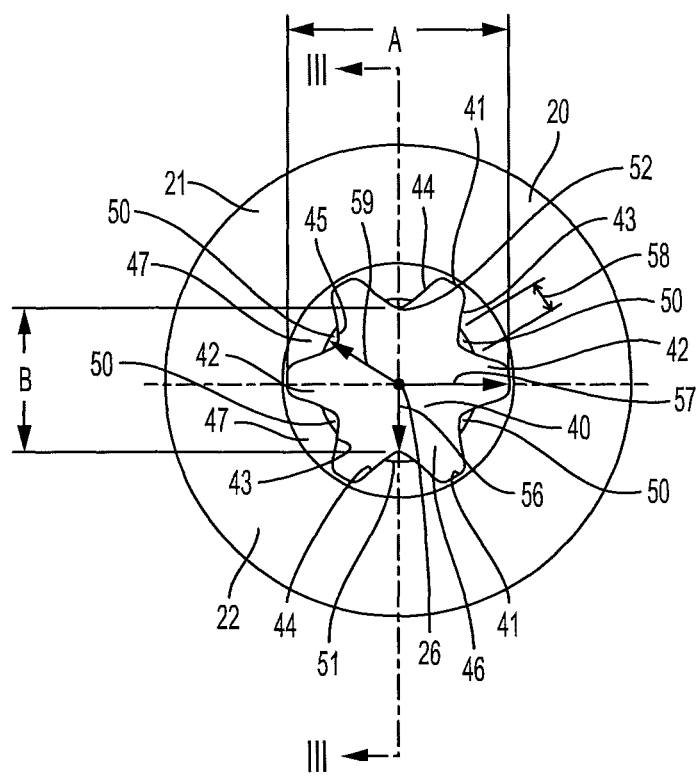
FIG. 2 is a top view of the recess of FIG. 1.
Figure 3:
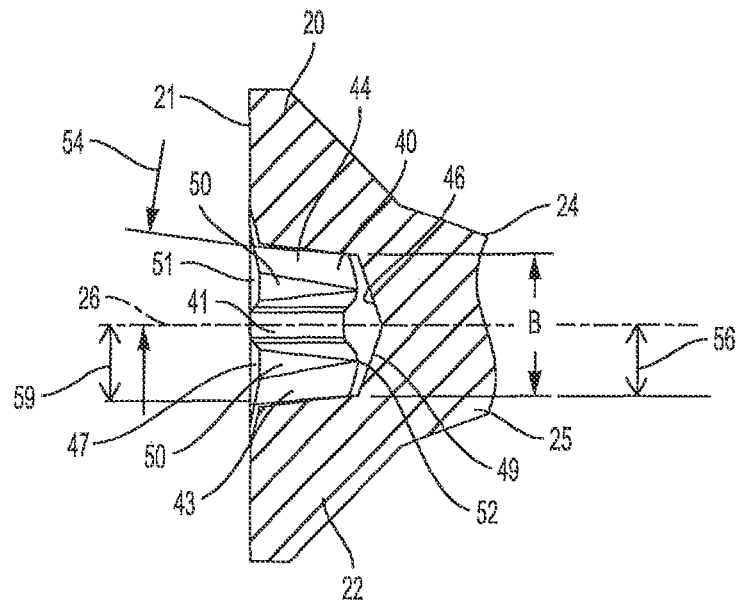
FIG. 3 is a view taken along section line of FIG. 2.

Refer now to FIGS. 1 through 3, there being shown a fastener recess according to an example embodiment. The fastener 20 includes a shank 24 having a central longitudinal axis 26. A head 22 is positioned at an end 25 of the shank 24. The head 22 has a six lobed star recess 40 centered on the axis 26. The recess 40 has six wings 42 radiating outwardly from the axis 26. The recess 40 has a recess outer radius 57 defined by a radial distance from the axis 26 to the outer-most extent of the wings. Each of the wings 42 has an installation driving surface 43 and a removal driving surface 44 (collectively drive walls) which are separated by a wing outer end wall 41. The wing driving surfaces 43, 44 are constructed in substantially parallel alignment with the central longitudinal axis 26.

The installation driving surface 43 and removal driving surface 44 of adjacent wings 42 are separated by a respective transition contour 45, the transition contour forming the radially inward-most portions of the wings 42. A wedge is formed in the transition contour to present a tapered interface surface 50. The interface surface 50 is a non-driving surface. Each interface surface 50 has a top 51, a bottom 52 and a pair of opposed edges 53, 55. Each opposed edge 53, 55 creates a transition from each installation and removal surfaces to the interface surface. The advantages of the edges 53, 55 will be discussed below. The width 58 of the interface surface tapers from wider at the top 51 of the interface surface, which is shown proximate the top 48 of the recess 40 to narrower at the bottom 52 of the interface surface, which is shown proximate the bottom 46 of the recess 40.

The recess extends into the head 22 to a recess bottom 46, which may include a bottom chamfer cone 49 transitioning from interface surfaces 50 and the bottom of the drive walls 43, 44 and wing outer end walls 41 to the recess bottom 46. There is a top chamfer cone 47 transitioning from the head top surface 21 to the top 48 of the recess. However, alternative embodiments may not include top chamfer cone 47. It should be noted that in alternative embodiments the top 51 and bottom 52 of the interface surface need not be proximate to the top 48 and bottom 46 of the recess 40, respectively. In such embodiments the top 51 and bottom 52 of each interface surface may be offset from the top 48 and bottom 46 of the recess, respectively.

The interface surfaces 50 are positioned a root (or bottom) radial distance 56 from the axis 26 at the bottom 52 of the interface surface. The root radial distance defines the recess inner radius 56. The interface surface 50 is positioned a top radial distance 59 from the axis 26 at the top 51 of the interface surface. The top radial distance 59 is larger than the recess inner radius (root or bottom radial distance) 56. The ratio of the recess inner radius 56 to the recess outer radius 57 is from about 0.60 to about 0.65. In another example, the ratio of the recess inner radius 56 to the recess outer radius 57 is from 0.60 to 0.65. In one example, the ratio of the recess inner radius 56 to the recess outer radius 57 is about 0.64 and in another example is equal to 0.64.

The tapered interface surface 50 is, in one example, concave to the axis 26. However, the tapered interface surface may also be flat. The tapered interface surface 50 may also be alternative shapes provided edges 53, 55 are formed. In one particular concave configuration, the taper interface surface 50 has a radius of curvature equal to the radial distance from the axis 26 to the interface surface 50. That is, the radius of curvature of the taper interface surface 50 decreases from the top 51 of interface 50 to the bottom 52 of interface 50. In an alternative embodiment, the radius of curvature of the concave taper interface surface 50 is greater than distance from the axis to the interface surface. In another alternative embodiment, each portion of the concave interface surface is positioned a radial distance greater than or equal to the radial distance from the axis 26 to the transition contour 45 at the interface surface edges 53, 55.

The interface surface 50 is tapered at a taper angle 54 (FIG. 3) with respect to the axis 26 from about one half degree (0.5°) to about twelve degrees (12°). In one particular embodiment, the taper angle 54 is preferably from about four degrees (4°) to about eight degrees (8°), and more preferably about six degrees (6°).

FIGS. 1 through 3 show taper interface surfaces 50 formed between every pair of adjacent wings 42. However, in some applications, it may be advantageous to construct the interference contours between only selected pairs, i.e., a subset, of transition contours with the understanding that some misalignment may commonly occur. This can be avoided to some extent, for example, in multi lobed configurations, by constructing the interference contours symmetrically about the recess, such as between opposing pairs of wings, between diametrically opposed pairs of wings, between every other pair of wings, or in triangular configurations.

Figure 4:
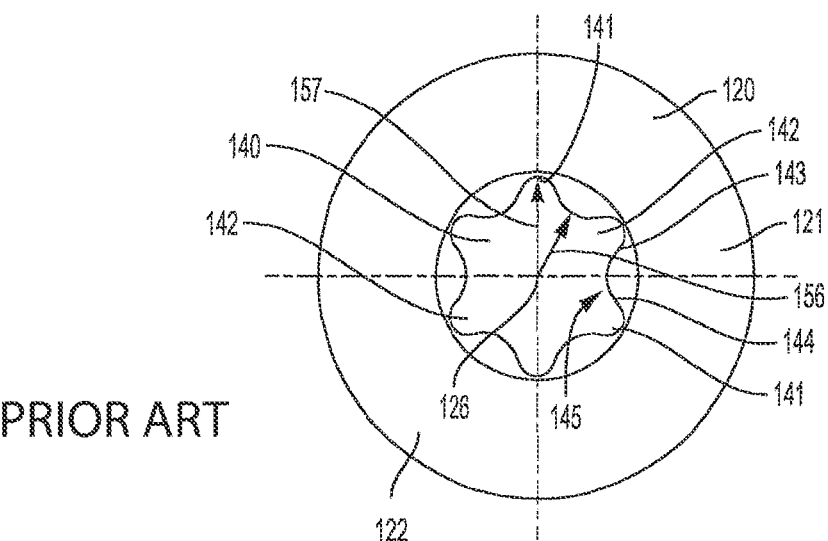
FIG. 4 is a top view of a standard recess.

FIG. 4 illustrates an example of a standard hexalobular threaded fastener having straight walled drive surfaces of the prior art. One example standard hexalobular recess, also referred to as a Torx® recess, are those fasteners made in accordance with the ISO 10664:2014 and NAS1800 (REV. 4) standards and each of those standards are incorporated by reference herein in their entirety. Each size of a standard hexalobular recess has a correspondingly mated standard hexalobular driver. Another example of a standard six lobed recess, and corresponding driver, is described in the Hughes '795 patent. Each of these recess together will be referred to herein as example standard six lobed recesses and their corresponding drivers as example standard six lobed drivers.

The term "straight walled drive surfaces" may be used herein to refer to fastener systems in which the driving surfaces are substantially in alignment, i.e., parallel with the longitudinal axis of the fastener. It is accepted in the fastener industry that statements, such as "parallel alignment" are subject to some deviation tolerances, as it is understood that such alignment is subject to manufacturing tolerances and may vary slightly in actual practice. In particular, FIG. 4 illustrates an example standard hexalobular recess, which is also described in the Hughes '795 patent (FIG. 2, element 30). With reference to FIG. 4 of the present application, fastener systems with a standard hexalobular recess are constructed having a fastener 120 and a mating driver bit (not shown). The fastener 120 is constructed having a head 122 and a threaded shank (not shown). In this example, a hexalobular configured recess 140 is formed in the head 122 with drive surfaces aligned in parallel with the axis 126 of the fastener 120 (straight walled). The recess 140 has a recess outer radius 157 defined by a radial distance from the axis 126 to the outer-most extent of the wings 142. Installation and removal surfaces 143, 144 of adjacent wings are separated by transition contours 145 and installation and removal surfaces 143, 144 of the same wing are each separated by a wing outer end wall 141. The recess has a recess inner radius 156 defined by the radial distance from the axis 126 to the transition contours 145. The ratio of the recess inner radius 156 to the recess outer radius 157 of the standard hexalobular driver is between 0.70-0.75 (depending on the size of the driver), see, for example, Shinjo '334, ISO 10664:2014, and NAS1800 (REV. 4) standards, which is larger than the ratio of the recess inner radius 56 to the recess outer radius 57 of recess 40 of the present application. As will be discussed below, the smaller recess inner radius 56 to recess outer radius 57 ratio of example recess 40 results in a number of advantageous benefits including improved torque per lobe of a mated driver.

Figure 5:
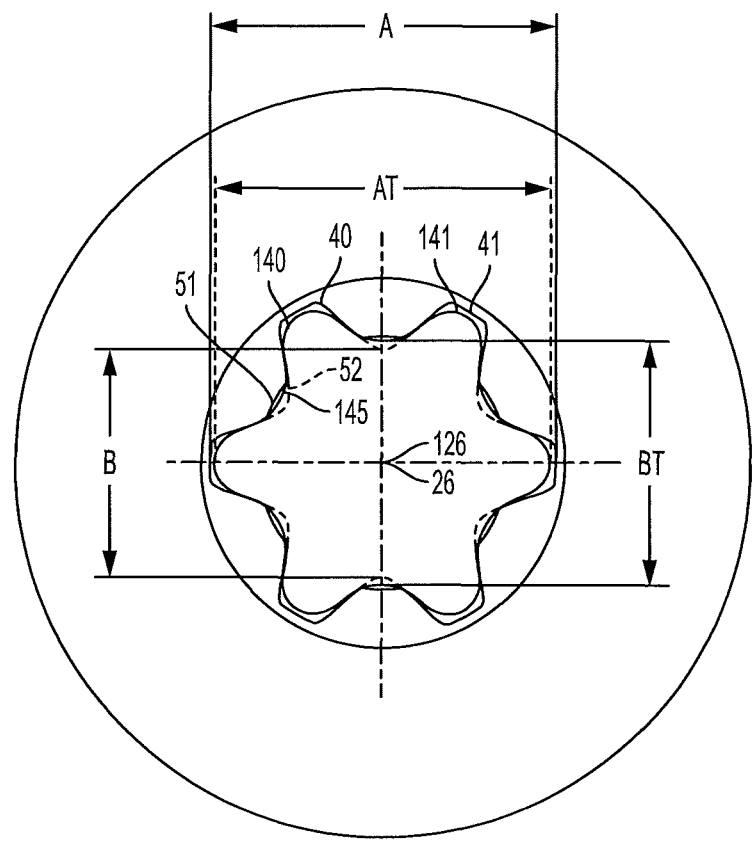
FIG. 5 is a schematic view showing the recess profile of FIG. 2 overlaid with the recess profile of FIG. 4.
Figure 6:
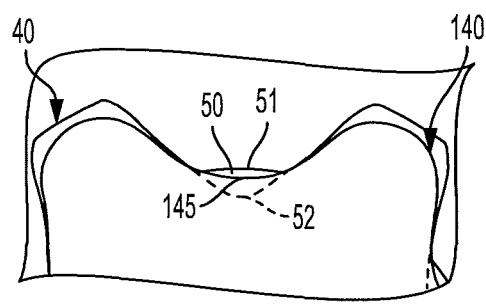
FIG. 6 is an expanded view of detail VI of FIG. 5.

FIG. 5 is a schematic view showing the recess 40 profile of FIG. 2 (an example recess of the present application) overlaid with the recess 140 profile of FIG. 4 (a standard hexalobular recess). FIG. 6 is an expanded view of detail VI of FIG. 5. The contour of the recess 40, in particular the contour of bottom 52 of the interface surface 50, is shown in FIGS. 5 and 6 in dotted lines where it overlaps with the contour of the standard recess 140. Although, in this particular illustration, the geometry of recess 140 is similar to the hexalobular type fastener systems of the Reiland reference cited above, it is intended only as an example of the use of the subject invention in comparison to a standard recess straight walled recess. FIGS. 5 and 6 are, of course, not intended to indicate that both recesses may be used at the same time, but only to illustrate the relative position of the example recess 40 and standard recess 140 features.

The interface surfaces 50 of recess 40 extends closer (radially) to axis 26 as compared to the transition contours 145 of recess 140 (the bottom 52 of the interface surface 50 is shown as a dotted line). Therefore, the inner radius 156 (FIG. 4) of recess 140 is larger than the inner radius 56 (FIG. 2) of recess 40. In addition the wing outer walls 41 of recess 40 extends further (radially) from axis 26 as compared to the transition wing outer walls 141 of recess 140. Therefore, the outer radius 157 (FIG. 4) of recess 140 is smaller than the outer radius 57 (FIG. 2) of recess 40. Each of these features, i.e., the smaller inner radius 56 and larger outer radius 57 result in an increased drive wall and provides an improved driver to recess driving torque per lobe. This feature will be discussed below with reference to FIG. 9.

Figure 7:
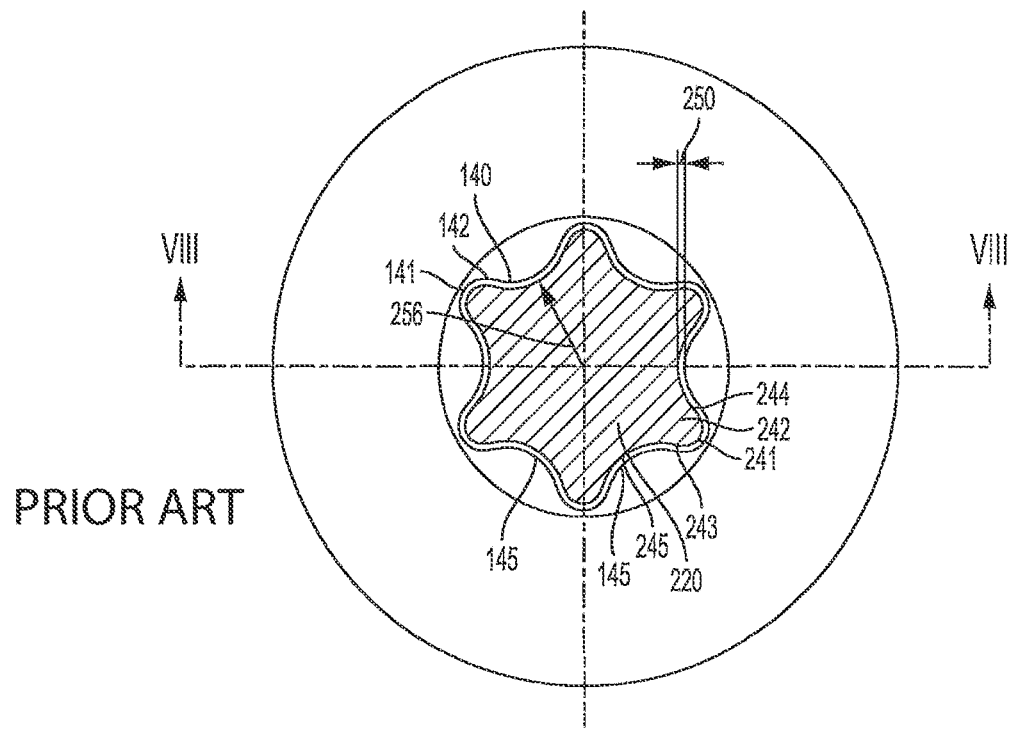
FIG. 7 is a top view of a standard driver mated with a standard recess.

FIG. 7 shows a top view of a standard hexalobular driver 220 mated with a standard hexalobular recess 140. The driver 220 has a bit end which is shown in cross section. The driver and bit end will be referred together as the driver 220. The driver 220 includes features that match those of the standard recess 140 including, for example, a central longitudinal axis 226, a central portion, and a plurality of lobes 242 radiating outwardly from the central portion which match the recess wings 142. Each of the lobes 242 have corresponding installation and removal surfaces 243, 244. In addition, the driver 220 also includes a transition contour 245 located between adjacent lobes 242 and lobe outer end walls 241 located between installation and removal surfaces 243, 244 of the same lobe 242. Each of the surfaces of the lobes 242 are constructed in parallel alignment with the driver longitudinal axis 226.

As noted above, and as a practical matter, in order to enable the standard hexalobular driver 220 to be inserted into the standard hexalobular recess 140, there necessarily must be some clearance 250 between the two. The clearance is the same around the circumference of the driver 220.

Figure 8:
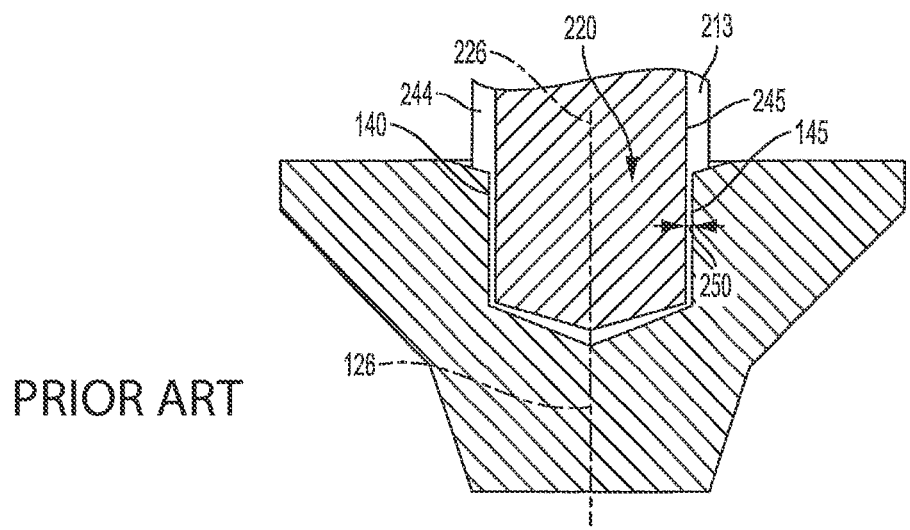
FIG. 8 is a view taken along section line VIII-VIII of FIG. 7.

FIG. 8 is a view taken along section line VIII-VIII of FIG. 7. In addition to the standard hexalobular driver 220 and the standard hexalobular recess 140 each having straight drive walls, each of the recess transition contour 145 and driver transition contour 245 are straight walled, i.e., each are parallel (within machining tolerances) with respect to axis 126. Therefore, the clearance 250 remains constant, provided the standard driver 220 is coaxial with the standard recess 140, and will not enhance the stability or frictional engagement of the driver/recess engagement. Although the clearance 250 allows the standard driver 220 to be easily inserted into the standard recess 140, the driver 220 is easily accidently misaligned or rocked in the recess 140 (axis 226 is not aligned with axis 126). Rocking contributes to concentrating forces on the screw head in localized areas with resulting high localized stresses and unstable alignment. Such localized high stress can plastically deform the recess, forming ramps or other deformations that result in premature, unintended disengagement of the driver from the recess and cause cam-out and driver/recess damage.

Figure 9:
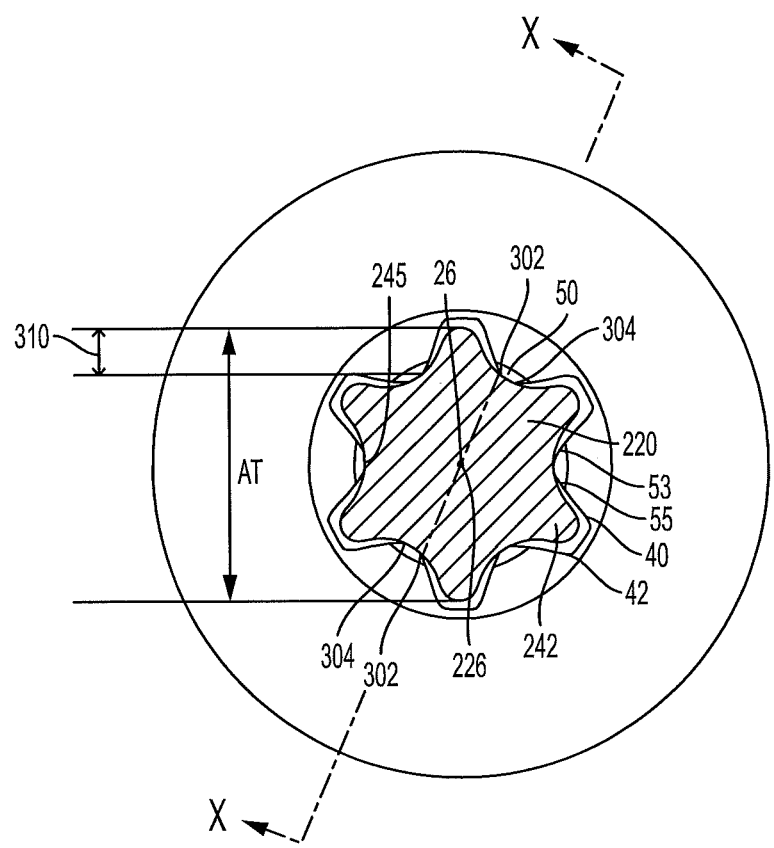
FIG. 9 is a top view of a standard driver mated with an example recess in accordance with disclosed embodiments.

FIG. 9 shows the same standard hexalobular driver 220 in a mated engagement with an example recess 40. The example recess 40 is configured to receive in a mated engagement any driver made to correspond to the hexalobular recess standards discussed above. As shown in FIG. 2, the recess 40 is constructed with a tapered interference surface 50 formed in the "B" dimension surface of the recess transition contour 45. As discussed earlier, the inner radius 56 (FIG. 2) of recess 40 is smaller than the inner radius 156 (FIG. 4) of the standard hexalobular recess. This is a result of the tapered interface surface/wedge 50 being tapered toward the axis 26. Further, the recess inner radius 56 is smaller than the top radial distance 59.

The recess is narrowed relative to the standard hexalobular recess 140 (FIG. 7) to provide a frictional engagement when the fastener 20 and driver 220 are in the mated engagement. The driver 220 has an inner radius 256 greater than recess inner radius 56 and less then top radial distance 59 resulting in a negative clearance, i.e., interference at interface regions 302, 304, discussed below. As shown, the "A" dimension is also enlarged relative to the standard hexalobular recess 140 (FIG. 7) in order to allow greater compatibility with other standard six lobed drivers, for example those described in the Hughes '795 patent. However, in alternative embodiments only the "B" dimension is narrowed and the "A" dimension is held to the standard recess size for a fastener of the type illustrated in FIG. 4, which may improve the stability of the alignment of standard hexalobular drivers at the expense of additional compatibility.

Figure 10:
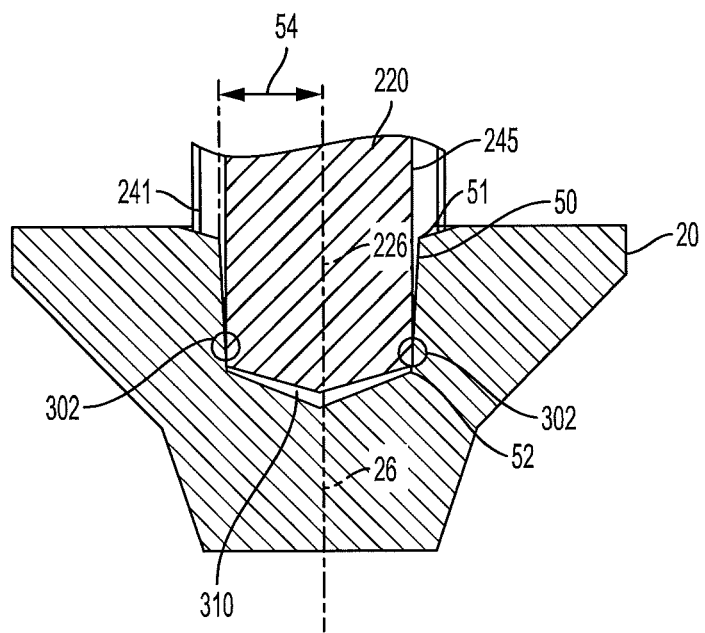
FIG. 10 is a view taken along section line X-X of FIG. 9.

With continuing reference to FIGS. 9 and 10, the tapered interface surfaces 50 are constructed to provide a significant frictional engagement ("stick fit") at edges 53, 55 resulting in two separate interface regions 302, 304. Because opposed edge 53, 55 are at the transition from each installation and removal surfaces to the interface surface, less material is required to deform upon insertion of a driver to acquire a sufficient stick-fit. Contacting in a lower portion of the recess also provides for a smaller area of contact also improving stick-fit. The two interface regions 302, 304 provide an increase in the stability of the contact between the recess 40 and driver 220 by providing two points of stability at each interface surface 50, thus improving axial alignment and reducing the risk of cam out. By having two interface regions as opposed to a single line or surface contact better stability is provided. The stick fit is created where the straight walled transition contour 245 contacts tapered interface surface 50. It should be noted that some incline in the driver wall may still provide sufficient stick fit, provided there is sufficient contact at interface regions 302, 304. The improved stick fit of the example recess 40 will increase the speed of application of fasteners to the work piece as well as decrease cam-out and driver/recess damage. The degree of stick fit can be adjusted during manufacturing of the recess by adjusting the taper angle 54. Each interface region 302, 304 may be various combinations of point and line contacts along edges 53,55 depending on the particular configuration of the standard six lobed driver. Regardless of the type of contact, there are two interface regions 302, 304 between each tapered interface surface 50 and driver transition contour 245. The two interface regions 302, 304 provide increased stability to the mated engagement of the driver bit and the recess as compared to prior known recesses by helping minimize rocking of the driver within the recess, thus greatly improving axial alignment and engagement of the lobes with the wings. This is particularly useful when the fastener 20 is non-uniform. Non-uniformity may occur due to a number of reasons. Examples include, but are not limited to, machine tolerances during manufacturing, uneven plating, uneven coatings, painting after fastener insertion, or deformation during insertion or previous installation or removal cycles. Example coatings include, but are not limited to, electro-zinc & clear, electro-zinc & yellow, electro-zinc & wax, mechanical zinc & clear, mechanical zinc & yellow, black phosphate, black phosphate and oil, oil, wax, nickel, cadmium & wax, hot-dip galvanized, dacrotizing. It should be noted that in some examples, such as when the driver and fastener are not in complete axial alignment or due to manufacturing tolerance in use there may not be established two interface regions in each and every recess wing. Nevertheless, stick-fit and stability advantages may still be realized with sufficient interface regions throughout the mated engagement.

In addition to the increased stability provided by the frictional interface at the interface regions 302, 304, the inner radius 56 of recess 40 is smaller than the inner radius 156 of the standard hexalobular recess 140. That smaller inner radius 56 in combination with the tapered interface surface 50 results in contact with the driver closer to the center axis 226. This provides additional drive wall for transferring torque as shown as driver lobe engagement length 310. This results in a drive-wall-ratio of the driver lobe engagement length 310 to "AT" dimension of from about 0.15 to about 0.21. In one particular embodiment, the drive-wall-ratio is preferably from about 0.17 to about 0.19, and more preferably about 0.18. An increased drive-wall-ratio improves bit to recess driving torque per lobe. This increase drive-wall-ratio is an advantage as compared to standard six lobe recess that utilize a 0.11 drive-wall-ratio according to the hexalobular recess standards when mated with a standard hexalobular driver FIG. 10 is a view taken along section line X-X of FIG. 9 through diametrically opposed interface regions 302. It shows the frictional engagement between the driver bit end and the tapered interface surface 50 at interface region 302 occurs in the lower part of the recess. In an alternative embodiment, the tapered interface surface 50 at interface region 304 occurs in the lower one third of the recess. A small clearance 310 between the driver 220 and the recess 40 is provided upon mating to ensure contact at interface regions 302, 304 instead of bottoming out, to allow clearance for plating build up in the bottom of the recess, and also to prevent damage to the driver 220 tip.

Figure 11:
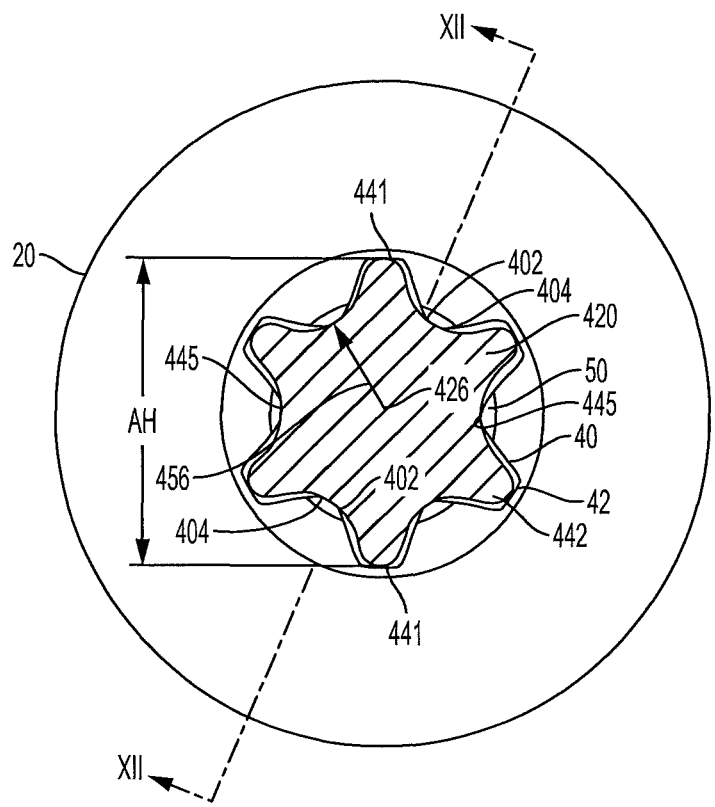
FIG. 11 is a top view of a standard driver mated with an example recess in accordance with disclosed embodiments.
Figure 12:
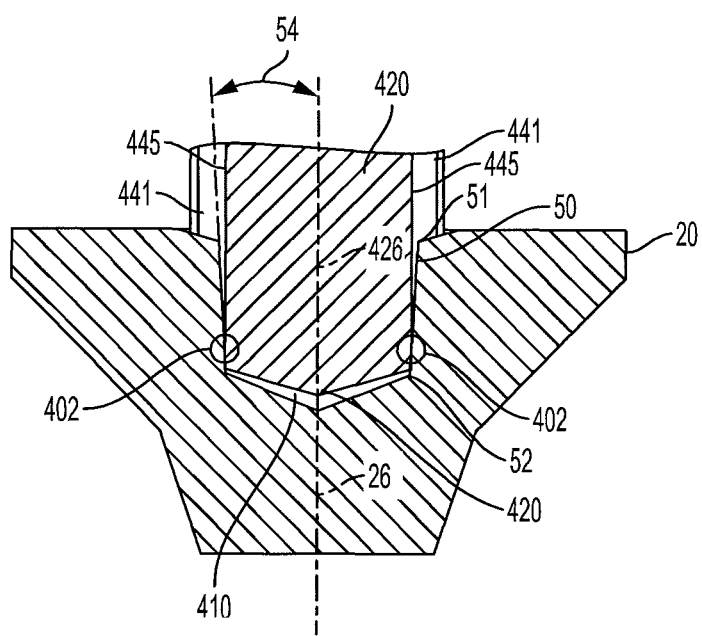
FIG. 12 is a view taken along section line XII-XII of FIG. 11.
Figure 14:
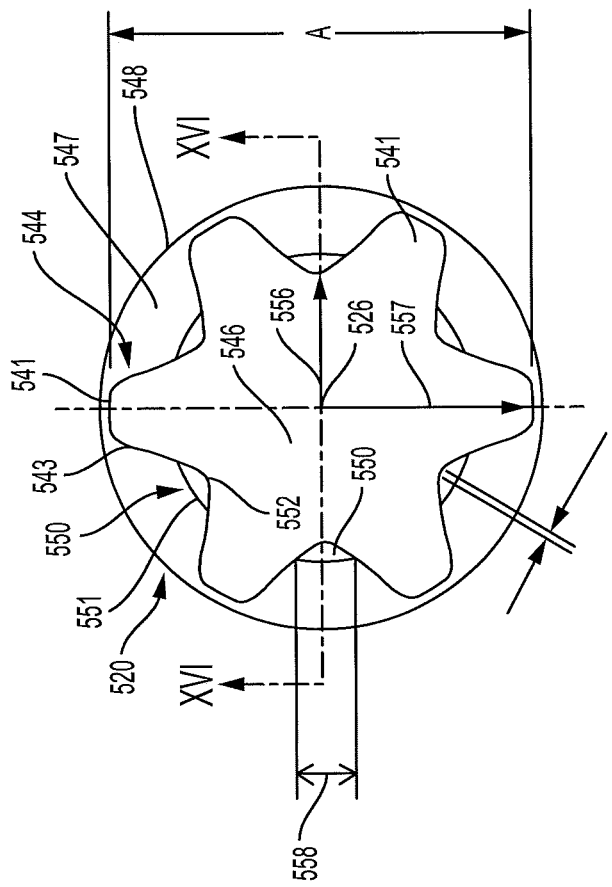
FIG. 14 is an end view of the punch of FIG. 13.
Figure 13:
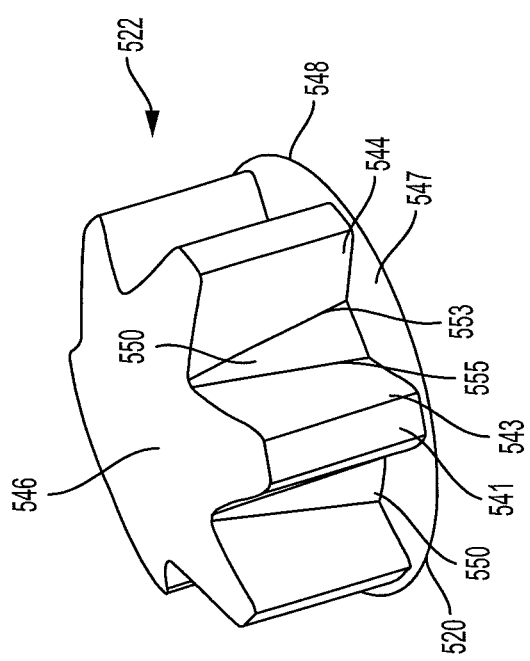
FIG. 13 is a perspective view of an example punch in accordance with disclosed embodiments.
Figure 16:
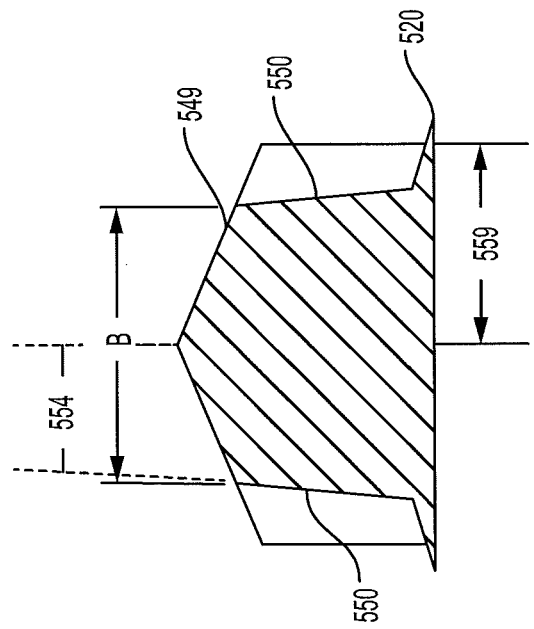
FIG. 16 is a view taken along section line XVI-XVI of FIG. 14.
Figure 15:
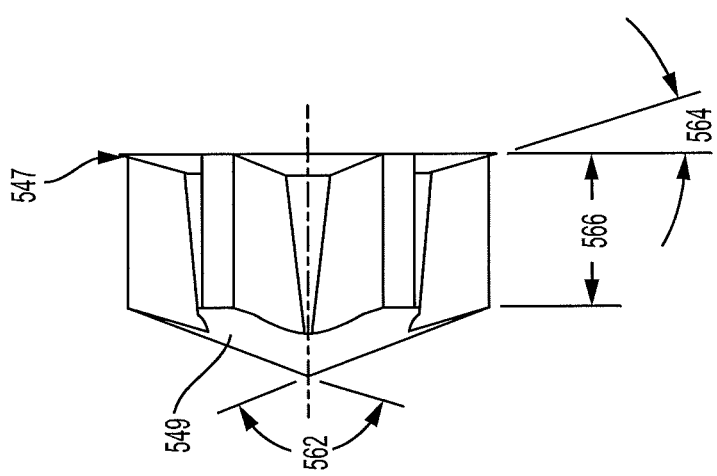
FIG. 15 is a side view of the punch of FIG. 13.

FIGS. 11-12 shows another standard six lobed driver 420, namely the six lobed driver described in the Hughes '795 patent, in mating engagement with recess 40. Because of the improved configuration of recess 40, fastener 20 is able to provide mating engagement with multiple six lobed drivers, including the Hughes '795 patent driver. The driver 420 includes a central longitudinal axis 426, a central portion, and a plurality of lobes 442 radiating outwardly from the central portion. Adjacent lobes 442 are separated by transition contours 445. The lobes 442 have been expanded in the "AH" dimension between opposing lobe outer end walls 441 as compared to the standard hexalobular driver 220 and as described in the Hughes '795 patent.

The driver 420 has an inner radius 456 greater than recess inner radius 56 (FIG. 2) and less then top radial distance 59 (FIGS. 2-3) resulting in a negative clearance, i.e., interference at interface regions 402, 404. The driver 420 to recess 40 mated engagement provides similar advantages as those described with reference to FIGS. 9 and 10 including, but not limited to, decreased rocking and an increased drive-wall-ratio that improves bit to recess driving torque per lobe.

FIG. 12 is a view taken along section line XII-XII of FIG. 11 through diametrically opposed interface regions 402. It shows the frictional engagement between the driver bit end and the tapered interface surface 50 at interface region 402 occurs in the lower part of the recess. In an alternative embodiment, the tapered interface surface 50 at interface region 304 occurs in the lower one third of the recess. A small clearance 410 between the driver 220 and the recess 40 is provided upon mating for the same reasons discussed with reference to FIG. 10.

The above features may be applied with similar results to other straight walled fastener systems. As another embodiment, the spiral drive system of the cited standard spiral driver patents may be improved upon by constructing a tapered interface surface/wedge on the opposing "B" dimension transition contours.

For example, shown in TABLE 1 are example "A" and "B" dimensions at the outermost portion of the wing and at the transition contour, respectively, in inches. Such drivers and corresponding recesses may be formed according to SAE International standard AS6305 (issued 2017-01) and are available from The Phillips Screw Company™ under the drive system MORTORQ® Spiral. SAE International standard AS6305 (issued 2017-01) is incorporated by reference in its entirety herein.

TABLE 1

| DRIVE SIZE | Recess "A" Dimension (diameter at outermost portion of the wing) (inches) (MAX) | Recess "B" Dimension (diameter recess transition contour) (inches) (NOM) | Driver "B" Dimension (diameter at the driver transition contour) (inches) |
| --- | --- | --- | --- |
| 000 | .0750 | .0355 | .0325 |
| 00 | .1230 | .0585 | .0541 |

TABLE 1-continued

| DRIVE SIZE | Recess "A" Dimension (diameter at outermost portion of the wing) (inches) (MAX) | Recess "B" Dimension (diameter recess transition contour) (inches) (NOM) | Driver "B" Dimension (diameter at the driver transition contour) (inches) |
|---|---|---|---|
| 0 | .1724 | .0821 | .0779 |
| 1 | .2425 | .1141 | .1091 |
| 2 | .3100 | .1460 | .1399 |
| 3 | .3557 | .1676 | .1604 |
| 4 | .4305 | .2030 | .1941 |
| 5 | .5083 | .2399 | .2295 |
| 6 | .5958 | .2811 | .2694 |
| 7 | .8023 | .3787 | .3655 |

An improved recess, in accordance with the present disclosure, that would correspond to the standard Stacy driver can be constructed with disclosed interface surfaces/ wedges such that the driver bit end has a radius at the transition contour (half of the driver "B" dimension), which is greater than the recess root radial distance of the improved recess and less than the improved recess top radial distance. This embodiment will not be described further, since its operation and construction can be obtained from the above description.

The recesses of the present application may be manufactured in a conventional two-blow header machine. The punch typically will be formed to include a body and a nib adapted to form the head of the fastener with the disclosed corresponding recess (FIGS. 1-3 and 9-11). Punches may be formed according to conventional punch-forming techniques such as use of hobbing dies. Drivers in accordance with the invention also can be manufactured using conventional techniques, such as by stamping a driver blank with one or more shaped dies to form the desired shape wings or, by milling the driver bit using specially shaped milling cutters.

With reference to FIGS. 13-16, disclosed example recesses may be formed by a heading punch adapted to form the head of the fastener with the disclosed corresponding recess. The recess can be formed in conventional heading techniques in, for example, a two blow header. FIGS. 13-16 illustrate a punch 520 configured to form example disclosed recess 40. The punch is a positive corresponding to the negative of the recess 40 embodiments described with respect to FIGS. 1-3 and 9-11. Thus, features and dimensions described with reference to disclosed punch 520 are also applicable to corresponding recess 40 features and embodiments and vice versa.

The punch includes body portion (not shown) having a face (not shown) and an integral nib 540 that protrudes from the face. The nib 540 is the complement of the shape of the recess and the face of the punch is of complementary shape to that of the intended screw head, shown in FIG. 3 as a flathead. The nib 540 includes a top chamfer cone forming portion 547, which has a chamfer angle 564. The nib 540 has a six lobed star configuration centered on the axis 526. The nib 540 has six wing forming portions 542 radiating outwardly from the axis 526. The nib 540 has a nib outer radius 557 defined by a radial distance from the axis 526 to the outer-most extent of the wing forming portions 542. Each of the wing forming portions 542 has an installation driving surface forming portion 543 and a removal driving surface forming portion 544 (collectively drive wall forming portions) which are separated by a wing outer end wall forming portion 541. The wing outer end wall forming portion 541 have a depth 566. The wing driving surface forming portions 543, 544 are constructed in substantially parallel alignment with the central longitudinal axis 526.

The installation driving surface forming portion 543 and removal driving surface forming portion 544 of adjacent wing forming portions 542 are separated by a respective transition contour forming portion 545, the transition contour forming portion forming the radially inward-most portions of the wing forming portions 542. A wedge forming portion is formed in the transition contour forming portion 545 to present a tapered interface surface forming portion 550. The interface surface forming portion 550 forms a non-driving surface. An additional benefit of the location of the interface surface forming portion 550 is that interface surface 50 is easier to form with a punch at the "B" dimension as compared to, for example, forming the recess in the "A" dimension, for example the recess of the Hughes '795 patent. Forming the interface surface on the "B" dimension has less risk that the material outside the wing will blow out during manufacture.

Each interface surface forming portion 550 has a top forming portion 551, a bottom forming portion 552 and a pair of opposed edge forming portions 553, 555. The advantages of the edge forming portions 553, 555 were discussed above with reference to opposed edges 53 and 55 of recess 40. Further, because the edges 53 and 55 are tapered to a point proximate the bottom 46 of the recess 40, in this example, by edge forming portions 553, 555, the punch 520 is capable of removing more material and making the process of forming the recess more efficient. The width 558 of the interface surface forming portions 550 taper from wider at the top forming portion 551 of the interface surface, which is shown proximate the top forming portion 548 of the recess 540, to narrower at the bottom forming portion 552 of the interface surface forming portion 550, which is shown proximate the bottom forming portion 546 of the recess 540.

The nib 540 extends to a recess bottom forming portion 546, which may include a bottom chamfer cone forming portion 549 transitioning from interface surface forming portions 550 and the bottom forming portions of the drive wall forming portions 543,544 and wing outer end wall forming portions 541 to the recess bottom forming portion 546. The bottom chamfer cone forming portion has a chamfer angle 562. There is a top chamfer cone forming portion 547 transitioning from the body portion top forming portion 548 of the recess. However, alternative embodiments may not include top chamfer cone forming portion 547. It should be noted that in alternative embodiments the top forming portion 551 and bottom forming portion 552 of the interface surface forming portion need not be proximate to the top forming portion 548 and bottom forming portion 546 of the recess forming portion 540, respectively. In such embodiments the top forming portion 551 and bottom forming portion 552 of each interface surface forming portion may be offset from the top forming portion 548 and bottom forming portion 546 of the recess forming portion, respectively.

The interface surface forming portions 550 are positioned a root (or bottom) radial distance 556 from the axis 526 at the bottom forming portion 552 of the interface surface forming portion 550. The root radial 556 distance defines the recess forming portion inner radius 556. The interface surface forming portion 550 is positioned a top forming portion radial distance 559 from the axis 526 at the top forming portion 551 of the interface surface forming portion 550. The top forming portion radial distance 559 is larger than the recess forming portion inner radius (root or bottom radial distance) 556. The ratio of the recess forming portion inner radius 556 to the nib outer radius 557 is from about 0.60 to about 0.65. In one example, the ratio of the recess forming portion inner radius 556 to the nib outer radius 557 is about 0.64 and in another example, the nib outer radius 557 is equal to 0.64.

The tapered interface surface forming portion 550 is concave to the axis 526. However, the tapered interface surface forming portion 550 may also be flat. Tapered interface surface forming portions 550 may also be alternative shapes provided edge forming portions 553, 555 are formed. In one particular concave configuration, the taper interface surface forming portion 550 has a radius of curvature equal to the radial distance from the axis 26 to the interface surface forming portion 550. That is, the radius of curvature of the taper interface surface forming portion 550 decreases from the top forming portion 551 of interface forming portion 550 to the bottom forming portion 552 of interface forming portion 550. In an alternative embodiment, the radius of curvature of the concave taper interface surface forming portion 550 is constant and equal to the top forming portion radial distance 559. In another alternative embodiment, each portion of the concave interface surface forming portion 550 is positioned a radial distance greater than or equal to the radial distance from the axis 26 to the transition contour forming portion 545 at the interface surface edge forming portions 553, 555.

The interface surface forming portion 550 is tapered at an angle with respect to the axis 26 from about one half degree (0.5°) to about twelve degrees (12°). In one particular embodiment, the interface surface forming portion 550 is preferably tapered in at a taper angle 554 (FIG. 3) from about four degrees (4°) to about eight degrees (8°), and more preferably about six degrees (6°).

FIGS. 13-16 show taper interface surface forming portions 550 formed between every pair of adjacent wing forming portion 542. However, in some applications, it may be advantageous to construct the interference contours between only selected pairs, i.e., a subset, of transition contours with the understanding that some misalignment may commonly occur. This can be avoided to some extent, for example, in multi-lobed configurations, by constructing the interference contours symmetrically about the recess, such as between opposing pairs of wings, between diametrically opposed pairs of wings, between every other pair of wings, or in triangular configurations.

A threaded fastener is formed having a driver-engageable recess, like that of recess 40 (FIGS. 1-3), i.e., that mate with the corresponding standard six lobed drivers as discussed above, by mechanically forming the head and recess. The head 22 may be formed in a conventional two-blow header machine in which the end of the wire or other material from which the fastener is made is supported in a die of the header machine and its head end is impacted, first with a punch that partially forms the head, and then with a finishing punch, like those described with reference to FIGS. 12-15, that finishes the head and forms the driver-engageable recess. The general manufacturing of fasteners is well known and will not be described further in this application. An assortment of such well known methods can be used to construct the subject.

The above description and drawings are only to be considered illustrative of specific embodiments, which achieve the features and advantages described herein. Modifications and substitutions for specific conditions and materials and otherwise can be made. Fasteners are constructed in many different configurations and the application of the subject matter of this application is not intended to be limited to any particular type. For example, the recess 40 of the embodiment of FIGS. 1-3 is hexalobular. However the principles of the disclosure may be applied to recess systems with three, four, five, eight or other number of wings and lobes. As another example, the embodiments described above are illustrated as the common form of fastener system involving a female recess on the fastener and a male configured driver. The interference contours of the subject fastener system, however, can be applied as well to the opposite arrangement (not shown) with a female recess (socket) on the driver and a male configured fastener. For another example, some fasteners do not have heads that clamp the work piece to the substrate. They may use a second threaded section to engage the work piece, instead. Whereas certain fasteners have clamping heads, the advantages provided by the configurations illustrated may be obtained in other fastener types such as non-clamping fasteners and others. Accordingly, the inventions are not considered as being limited by the foregoing description and drawings, but are intended to embrace all such alternatives, modifications, substitutes and variances.

What is claimed as new and desired to be protected by Letters Patent of the United States is:

1. A fastener, comprising: a head and a shank having a central longitudinal axis, wherein the head is constructed including a recess having a central portion and a plurality of wings radiating outwardly from the central portion, each of the wings having driving surfaces including an installation driving surface and a removal driving surface, separated by a non-driving transition contour, the non-driving transition contour forming a radially inward-most portion of the wing, and wherein the driving surfaces are constructed in substantially parallel alignment with the central longitudinal axis of the fastener; and a wedge formed in the non-driving transition contour of the wings to present a tapered interface surface, wherein the recess is configured to engage in a mating engagement with a corresponding driver bit end having straight drive walls parallel to the longitudinal axis during the mating engagement and a radius at a transition contour greater than a recess inner root radial distance and less than a recess top radial distance and further having a bit end diameter and defining a driver lobe engagement length with each of the driving surfaces of the fastener, wherein a ratio of the driver lobe engagement length to the bit diameter during the mating engagement is greater than 0.11, wherein the mating engagement includes a lowest frictional engagement between the tapered interface surface and a straight-walled transition contour of the driver bit end parallel to the longitudinal axis that is above a bottom of the tapered interface surface and within a lower one third of the recess, and wherein during the mating engagement the driving surfaces of the fastener extend to the lowest frictional engagement, wherein each tapered interface surface is concave, having a radius of curvature greater than a radial distance from the longitudinal axis to the tapered interface surface.

2. The fastener of claim 1, wherein the fastener is configured such that the ratio of the driver lobe engagement length to the bit diameter during the mating engagement of the fastener with the corresponding driver bit end is from about 0.15 to about 0.21.

3. The fastener of claim 1, wherein each tapered interface surface is constructed to form a frictional engagement with the driver bit end at two interface regions that are separate from each other.

4. The fastener of claim 3, wherein the two interface regions are configured to provide more than one frictional surface contact between each interface surface and the driver bit end.

5. The fastener of claim 3, wherein the two interface regions are at opposed edges of each tapered interface surface.

6. The fastener of claim 3, wherein the two interface regions are entirely within the lower one third of the recess.

7. The fastener of claim 1, wherein the recess includes exactly six of the wings.

8. The fastener of claim 1, wherein the recess includes exactly four of the wings.

9. The fastener of claim 1, wherein each interface surface is tapered at an angle with respect to the longitudinal axis, wherein the angle is selected from one the following options: (1) in the range of about one half degree (0.5°) to about twelve degrees (12°), (2) in the range of about four degrees (4°) to about eight degrees (8°), (3) about six degrees (6°).

10. A system, comprising:
a fastener including: a head and a shank having a central longitudinal axis, wherein the head is constructed including a recess having a central portion and a plurality of wings radiating outwardly from the central portion, each of the wings having driving surfaces including an installation driving surface and a removal driving surface, separated by a non-driving transition contour, the non-driving transition contour forming a radially inward-most portion of the wing, and wherein the driving surfaces are constructed in substantially parallel alignment with the central longitudinal axis of the fastener; and a wedge formed in the non-driving transition contour of the wings to present a tapered interface surface, wherein the recess is configured to engage in a mating engagement with a corresponding driver bit end having straight drive walls parallel to the longitudinal axis during the mating engagement and a radius at a transition contour greater than a recess inner root radial distance and less than a recess top radial distance and further having a bit end diameter and defining a driver lobe engagement length with each of the driving surfaces of the fastener, wherein a ratio of the driver lobe engagement length to the bit diameter during the mating engagement is greater than 0.11, wherein the mating engagement includes a lowest frictional engagement between the tapered interface surface and a straight-walled transition contour of the driver bit end parallel to the longitudinal axis that is above a bottom of the tapered interface surface and within a lower one third of the recess, and wherein during the mating engagement the driving surfaces of the fastener extend to the lowest frictional engagement; and
a driver including the corresponding driver bit end.

11. A fastener, comprising: a head and a shank having a central longitudinal axis, wherein the head is constructed including a recess having a central portion and a plurality of wings radiating outwardly from the central portion, each of the wings having driving surfaces including an installation driving surface and a removal driving surface, separated by a non-driving transition contour, the non-driving transition contour forming a radially inward-most portion of the wing, and wherein the driving surfaces are constructed in substantially parallel alignment with the central longitudinal axis of the fastener; and a wedge formed in the non-driving transition contour of the wings to present a tapered interface surface, wherein the recess is configured to matingly engage with a corresponding driver bit end such that the driver bit end has a radius at a transition contour greater than a recess inner root radial distance and less than a recess top radial distance, wherein each tapered interface surface is concave, having a radius of curvature greater than a radial distance from the longitudinal axis to the tapered interface surface.

* * * * *